US012804668B2

(12) United States Patent
Lin et al.

(10) Patent No.: US 12,804,668 B2
(45) Date of Patent: Nov. 17, 2026

(54) METHOD FOR WIRELESS COMMUNICATION, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Yanan Lin, Dongguan (CN); Jing Xu, Dongguan (CN); Yi Zhang, Dongguan (CN); Bin Liang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 253 days.

(21) Appl. No.: 18/740,983

(22) Filed: Jun. 12, 2024

(65) Prior Publication Data

US 2024/0334444 A1 Oct. 3, 2024

Related U.S. Application Data

(63) Continuation of application No. PCT/CN2021/138874, filed on Dec. 16, 2021.

(51) Int. Cl.
*H04W 72/12* (2023.01)
*H04W 72/23* (2023.01)

(52) U.S. Cl.
CPC ........... *H04W 72/23* (2023.01); *H04W 72/12* (2013.01)

(58) Field of Classification Search
CPC ... H04W 72/23; H04W 72/12; H04W 72/232; H04L 5/00
See application file for complete search history.

(56) References Cited

U.S. PATENT DOCUMENTS

2021/0006376 A1* 1/2021 Cirik ..................... H04L 1/1861
2021/0274535 A1* 9/2021 Yi ......................... H04L 5/0053
2021/0321443 A1 10/2021 Takeda et al.
2023/0291509 A1* 9/2023 Baldemair ............ H04L 1/1861
2026/0006617 A1* 1/2026 Kim ...................... H04W 72/23

FOREIGN PATENT DOCUMENTS

CN 112564872 A 3/2021

OTHER PUBLICATIONS

LG (Summary #3 of PDSCH/PUSCH enhancements (Scheduling/HARQ), 3GPP 2108370, Aug. 27, 2021).*
Moderator (ZTE, RAN2 VC), Moderator's summary for [RAN94e-R18Prep-27] on CA/DC enhancements, 3GPP TSG RAN Meeting #94e, RP-212687, Electronic Meeting, Dec. 6-17, 2021. 51 pages.

(Continued)

*Primary Examiner* — Lakeram Jangbahadur
(74) *Attorney, Agent, or Firm* — Sheppard, Mullin, Richter & Hampton LLP

(57) ABSTRACT

A method for wireless communication, a terminal device, and a network device are provided, where the method includes the following. A terminal device receives first downlink control information (DCI), where the first DCI contains a transmission parameter for a first signal and is used to schedule at least one transmission channel for transmission in N cells, the transmission parameter for the first signal is used for a first cell, and N is a positive integer.

7 Claims, 3 Drawing Sheets

(56) References Cited

OTHER PUBLICATIONS

Moderator (LG Electronics), Summary #3 of PDSCH/PUSCH enhancements (Scheduling/HARQ), 3GPP TSG RAN WG1 #106-e, R1-2108370, e-Meeting, Aug. 16-27, 2021. 104 pages.
ZTE, Discussion on Multi-cell PDSCH Scheduling via a Single DCI, 3GPP TSG RAN WG1 Meeting #104-e, R1-2100111, e-Meeting, Jan. 25-Feb. 5, 2021. 17 pages.
WIPO, International Search Report and Written Opinion for International Application No. PCT/CN2021/138874, Aug. 29, 2022. 13 pages with English translation.

* cited by examiner

METHOD FOR WIRELESS COMMUNICATION, TERMINAL DEVICE, AND NETWORK DEVICE

CROSS-REFERENCE TO RELATED APPLICATION(S)

This application is a continuation of International Application No. PCT/CN2021/138874, filed Dec. 16, 2021, the entire disclosure of which is hereby incorporated by reference.

TECHNICAL FIELD

Embodiments of the disclosure relate to the field of communications, and more particularly to a method for wireless communication, a terminal device, and a network device.

RELATED ART

In the new radio (NR) system, a physical downlink control channel (PDCCH) carries downlink control information (DCI) sent from a network device to a terminal device. A PDCCH can support multiple DCI formats and aggregation levels, where different DCI formats have different payload sizes.

The DCI format not only contains parameters required for scheduling physical downlink shared channel (PDSCH) transmission or physical uplink shared channel (PUSCH) transmission, but also contains parameters that are not relevant for PDSCH transmission or PUSCH transmission, such as parameters used to trigger sounding reference signal (SRS) transmission in a carrier or a cell where a scheduled PDSCH or PUSCH is located.

In some scenarios, such as a carrier aggregation (CA) scenario or a dual connection (DC) scenario, it is considered to support that one DCI can schedule multiple PDSCHs or PUSCHs for transmission in multiple carriers or multiple cells. In this case, how to design a DCI format to reduce DCI load is a problem to be solved.

SUMMARY

The disclosure provides a method for wireless communication, a terminal device, and a network device.

In a first aspect, a method for wireless communication is provided. The method includes the following. A terminal device receives first DCI, where the first DCI contains a transmission parameter for a first signal and is used to schedule at least one physical channel for transmission in N cells, the transmission parameter for the first signal is used for a first cell, and N is a positive integer.

In a second aspect, a terminal device is provided. The terminal device includes a transceiver, a processor coupled to the transceiver, and a memory storing a computer program which, when executed by the processor, causes the terminal device to receive first DCI, where the first DCI contains a transmission parameter for a first signal and is used to schedule at least one physical channel for transmission in N cells, the transmission parameter for the first signal is used for a first cell, and N is a positive integer. The first cell is one of the N cells, or the first cell is determined from M cells according to a first sequence, where the N cells include the M cells, the at least one physical channel scheduled via the first DCI is transmitted in the M cells, Mis a positive integer, and M is less than or equal to N.

In a third aspect, a network device is provided. The network device includes a transceiver, a processor coupled to the transceiver, and a memory storing a computer program which, when executed by the processor, causes the network device to send first DCI, where the first DCI contains a transmission parameter for a first signal and is used to schedule at least one physical channel for transmission in N cells, the transmission parameter for the first signal is used for a first cell, and N is a positive integer. The first cell is one of the N cells, or the first cell is determined from M cells according to a first sequence, where the N cells include the M cells, the at least one physical channel scheduled via the first DCI is transmitted in the M cells, Mis a positive integer, and M is less than or equal to N.

Other features and aspects of the disclosed features will become apparent from the following detailed description, taken in conjunction with the accompanying drawings, which illustrate, by way of example, the features in accordance with implementations the disclosure. The summary is not intended to limit the scope of any implementations described herein.

DETAILED DESCRIPTION

Figure 1:
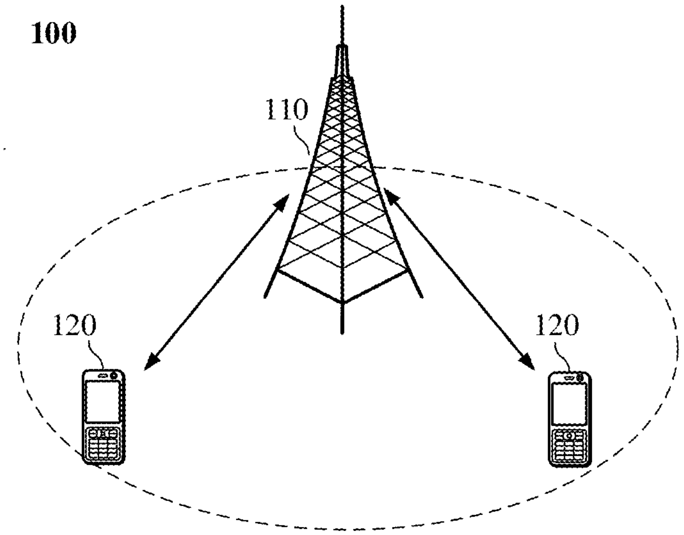
FIG. 1 is a schematic diagram illustrating an architecture of a communication system provided by embodiments of the disclosure.

The following will describe technical solutions of embodiments of the disclosure with reference to the accompanying drawings in embodiments of the disclosure. Apparently, embodiments described herein are merely some embodiments, rather than all embodiments, of the disclosure. Based on embodiments of the disclosure, all other embodiments obtained by those of ordinary skill in the art without creative effort shall fall within the protection scope of the disclosure.

The technical solutions of embodiments of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (WiFi), a $5^{th}$ generation (5G) communication system, or other communication systems, etc.

Generally speaking, a conventional communication system generally supports a limited quantity of connections and therefore is easy to implement. However, with the development of communication technology, a mobile communication system will not only support conventional communication but also support, for example, device-to-device (D2D) communication, machine-to-machine (M2M) communication, machine-type communication (MTC), vehicle-to-vehicle (V2V) communication, or vehicle to everything (V2X) communication, etc. Embodiments of the disclosure can also be applied to these communication systems.

Optionally, the communication system in embodiments of the disclosure may be applied to a carrier aggregation (CA) scenario, or may be applied to a dual connectivity (DC) scenario, or may be applied to a standalone (SA) scenario.

Optionally, the communication system in embodiments of the disclosure is applicable to an unlicensed spectrum, and an unlicensed spectrum may be regarded as a shared spectrum, or the communication system in embodiments of the disclosure is applicable to a licensed spectrum, and a licensed spectrum may be regarded as a non-shared spectrum.

Various embodiments of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc.

The terminal device may be a station (ST) in a WLAN, a cellular radio telephone, a cordless telephone, a session initiation protocol (SIP) telephone, a wireless local loop (WLL) station, a personal digital assistant (PDA), a handheld device or a computing device with wireless communication functions, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

In embodiments of the disclosure, the terminal device may be deployed on land, which includes indoor or outdoor, handheld, wearable, or in-vehicle. The terminal device may also be deployed on water (such as ships, etc.). The terminal device may also be deployed in the air (such as airplanes, balloons, satellites, etc.).

In embodiments of the disclosure, the terminal device may be a mobile phone, a pad, a computer with wireless transceiver functions, a virtual reality (VR) terminal device, an augmented reality (AR) terminal device, a wireless terminal device in industrial control, a wireless terminal device in self-driving, a wireless terminal device in remote medicine, a wireless terminal device in smart grid, a wireless terminal device in transportation safety, a wireless terminal device in smart city, or a wireless terminal device in smart home, etc.

By way of explanation rather than limitation, in embodiments of the disclosure, the terminal device may also be a wearable device. The wearable device may also be called a wearable smart device, which is a generic term for wearable devices obtained through intelligentization design and development on daily wearing products with wearable technology, for example, glasses, gloves, watches, clothes, accessories, and shoes. The wearable device is a portable device that can be directly worn or integrated into the clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of the functions of a smart phone, and for example, various types of smart bands and smart jewellery for physical monitoring, of which each is dedicated to application functions of a certain type and required to be used together with other devices such as a smart phone.

In embodiments of the disclosure, the network device may be a device configured to communicate with a mobile device, and the network device may be an access point (AP) in a WLAN, a base transceiver station (BTS) in GSM or CDMA, or maybe a Node B (NB) in WCDMA, or maybe an evolutional Node B (eNB or eNodeB) in LTE, or a relay station or AP, or an in-vehicle device, a wearable device, a network device (gNB) in an NR network, a network device in a future evolved PLMN, or a network device in an NTN, etc.

By way of explanation rather than limitation, in embodiments of the disclosure, the network device may be mobile. For example, the network device may be a mobile device. Optionally, the network device may be a satellite or a balloon base station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station deployed on land or water.

In embodiments of the disclosure, the network device serves a cell, and the terminal device communicates with the network device on a transmission resource (for example, a frequency-domain resource or a spectrum resource) for the cell. The cell may be a cell corresponding to the network device (for example, a base station). The cell may belong to a macro base station or may belong to a base station corresponding to a small cell. The small cell may include: a metro cell, a micro cell, a pico cell, a femto cell, and the like. These small cells are characterized by small coverage and low transmission power and are adapted to provide data transmission service with high-rate.

Exemplarily, FIG. 1 illustrates a communication system 100 to which embodiments of the disclosure are applied. The communication system 100 may include a network device 110. The network device 110 may be a device for communicating with a terminal device 120 (also referred to as "communication terminal" or "terminal"). The network device 110 can provide communication coverage for a specific geographical area and communicate with terminal devices in the coverage area.

FIG. 1 exemplarily illustrates one network device and two terminal devices. Optionally, the communication system 100 may also include multiple network devices, and there can be other quantities of terminal devices in a coverage area of each of the network devices. Embodiments of the disclosure are not limited in this regard.

Optionally, the communication system 100 may further include other network entities such as a network controller, a mobility management entity, or the like, and embodiments of the disclosure are not limited in this regard.

It should be understood that, in embodiments of the disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be elaborated again herein. The communication device may further include other devices such as a network controller, a mobility management entity, or other network entities in the communication system 100, and embodiments of the disclosure are not limited in this regard.

It should be understood that the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

It should be understood that "indication" referred to in embodiments of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that there is an association relationship between A and B.

In the elaboration of embodiments of the disclosure, the term "correspondence" may mean that there is a direct or indirect correspondence between the two, may mean that there is an association between the two, or may mean a relationship of indicating and indicated or configuring and configured, etc.

In embodiments of the disclosure, the "pre-defined" can be implemented by pre-saving a corresponding code or table in a device (for example, including the terminal device and the network device) or in other manners that can be used for indicating related information, and the disclosure is not limited in this regard. For example, the "pre-defined" may mean defined in a protocol.

In embodiments of the disclosure, the "protocol" may refer to a communication standard protocol, which may include, for example, an LTE protocol, an NR protocol, and a protocol applied to a future communication system, and the disclosure is not limited in this regard.

In order for better understanding of technical solutions of embodiments of the disclosure, downlink control information (DCI) formats involved in the disclosure are described as follows.

In the NR system, a physical downlink control channel (PDCCH) carries DCI sent from a network device to a terminal device. A PDCCH can support multiple DCI formats and aggregation levels. DCI Format 0_0, DCI Format 0_1, and DCI Format 0_2 are used to schedule a physical uplink shared channel (PUSCH) in a carrier/cell, and DCI Format 1_0, DCI Format 1_1, and DCI Format 1_2 are used to schedule a physical downlink shared channel (PDSCH) in a carrier/cell. Different DCI formats essentially have different payload sizes. Payload sizes of DCI Format 0_0 and DCI Format 1_0 depend on the bandwidth of a band width part (BWP). When the bandwidth of a BWP is determined, the payload sizes of DCI Format 0_0 and DCI Format 1_0 are determined accordingly. DCI Format 0_1, DCI Format 0_2, DCI Format 1_1, and DCI Format 1_2 contain multiple configurable information fields, so payload sizes of DCI Format 0_1, DCI Format 0_2, DCI Format 1_1, and DCI Format 1_2 depend not only on the bandwidth of a BWP but also depend on configuration by the network device. DCI Format 0_0 and DCI Format 1_0 have smaller payload sizes and are the most reliable, but have poor scheduling flexibility. DCI Format 0_1 and DCI Format 1_1 have the largest payload sizes and the greatest scheduling flexibility. DCI Format 0_2 is obtained by compressing DCI Format 0_1 and DCI Format 1_2 is obtained by compressing DCI Format 1_1. Although scheduling flexibility of DCI Format 0_2 and DCI Format 1_2 are reduced, the payload sizes of DCI Format 0_2 and DCI Format 1_2 are reduced, thus improving transmission reliability.

In some scenarios, such as a carrier aggregation (CA) scenario or a dual connection (DC) scenario, it is considered to support that one DCI can schedule multiple PDSCHs or multiple PUSCHs, that is, support that multiple PDSCHs or multiple PUSCHs are transmitted in multiple carriers, each of multiple PDSCHs or each of multiple PUSCHs is used to carry a different transport block (TB), and hybrid automatic repeat request-acknowledgement (HARQ-ACK) for multiple PDSCHs are fed over a same physical uplink control channel (PUCCH). In order to minimize the load of the DCI, some information fields (e.g., modulation and coding scheme (MCS), etc.) in the DCI are shared by all PDSCHs/PUSCHs. Meanwhile, in order to ensure suitable scheduling flexibility, some information fields (e.g., new data indicator (NDI), etc.) are configured independently for different PDSCHs/PUSCHs. For time domain resource indication, a multi-PUSCH function in the NR-U system can be multiplexed, i.e., a time domain resource assignment (TDRA) table can be extended so that each row can indicate time domain resources of two or more PDSCH/PUSCHs.

The DCI format not only contains parameters required for scheduling PDSCH transmission or PUSCH transmission, but also contains parameters that are not relevant for PDSCH transmission or PUSCH transmission. For example, the parameters that are not relevant for PDSCH transmission or PUSCH transmission include: parameters used to trigger sounding reference signal (SRS) transmission in a carrier where a scheduled channel is located, e.g., an SRS request, and an SRS resource indicator; parameters used to trigger channel state information reference signal (CSI-RS) association in a carrier where a scheduled channel is located, e.g., a zero power (ZP) CSI-RS trigger; and parameters used to trigger phase tracking reference signal (PTRS) association in a carrier where a scheduled channel is located, e.g., a PTRS demodulation reference signal (PTRS-DMRS) association.

In the case where one DCI is used to schedule PDSCH transmission or PUSCH transmission in multiple cells or multiple carriers, if the DCI is designed to contain multiple sets of parameters that are not relevant for PDSCH transmission or PUSCH transmission, the load of the DCI may be increased. Therefore, the DCI may be designed to contain one set of parameters that are not relevant for PDSCH transmission or PUSCH transmission. In this case, which cell or carrier the parameters are to be applied to is a problem to be solved.

In order for better understanding of technical solutions of embodiments of the disclosure, the technical solutions of the disclosure will be described in detail below in connection with embodiments. The following related art as an optional scheme can be arbitrarily combined with the technical solutions of embodiments of the disclosure, which shall all belong to the protection scope of embodiments of the disclosure. Embodiments of the disclosure include at least some of the following.

Figure 2:
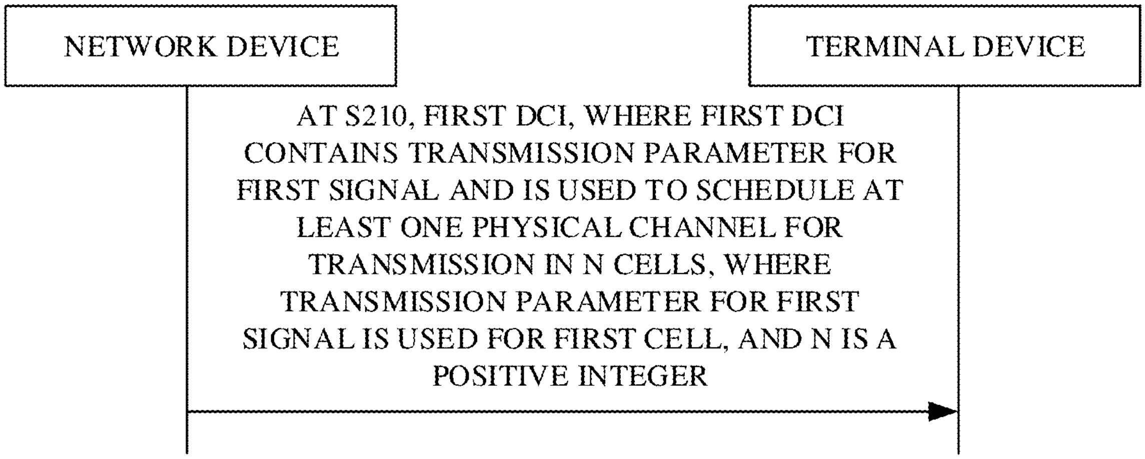
FIG. 2 is a schematic interactive diagram of a method for wireless communication provided by embodiments of the disclosure.

FIG. 2 is a schematic interactive diagram of a method 200 for wireless communication according to embodiments of the disclosure. As illustrated in FIG. 2, the method 200 includes at least some of the following.

At S210, a network device sends first DCI.

Correspondingly, a terminal device receives the first DCI.

The first DCI contains a transmission parameter(s) for a first signal and is used to schedule at least one physical channel for transmission in N cells, where the transmission parameter for the first signal is used for a first cell, and N is a positive integer.

It is understood that in embodiments of the disclosure, a cell may be replaced with a carrier.

In some embodiments, the first signal may be an uplink signal or a downlink signal, such as including, but not limited to, at least one of: an SRS, a CSI-RS, a ZP CSI-RS, or a PTRS.

In some embodiments, the transmission parameter for the first signal may include at least one of: a parameter(s) used to trigger SRS transmission in a carrier where a physical channel is located, e.g., an SRS request, and an SRS resource indicator; relevant parameters used to trigger CSI-RS association in a carrier where a physical channel is located, e.g., a ZP CSI-RS trigger; or relevant parameters used to trigger PTRS association in a carrier where a physical channel is located, e.g., a PTRS-DMRS association.

In some embodiments, the first DCI contains a second information field, where the second information field is used to determine or indicate the transmission parameter for the first signal. For example, the first DCI may contain only one second information field for carrying one set of transmission parameters for the first signal and does not need to contain the transmission parameter for the first signal for each of the N cells.

In some embodiments, the physical channel may be a PDSCH or a PUSCH.

For example, the first DCI is used to schedule multiple PDSCHs for transmission in multiple cells.

As another example, the first DCI is used to schedule multiple PUSCHs for transmission in multiple cells.

As yet another example, the first DCI is used for transmission of at least one PUSCH in at least one cell, and/or the first DCI is used for transmission of at least one PDSCH in at least one cell.

In some embodiments, the N cells may be cells where the physical channel(s) scheduled via the first DCI is located or the N cells may be a maximum cell range corresponding to the physical channel(s) scheduled via the first DCI.

That is, the N cells may be a cell range actually scheduled by the network device or the N cells may be a maximum cell range that can be scheduled by the network device.

In some embodiments, N is an integer greater than or equal to 2.

In some embodiments, the network device always schedules the physical channel(s) for transmission in the N cells. That is, a cell where the physical channel scheduled via the DCI is located is fixed, in other words, a scheduling relationship is semi-static. For example, the network device may further send second DCI, where the second DCI is also used to schedule at least one physical channel for transmission in the N cells, which is denoted as case 1.

In some other embodiments, the network device may schedule the physical channel(s) for transmission in some of or all the N cells. For example, the first DCI is used to schedule at least one physical channel for transmission in M cells, where M is a positive integer and M is less than or equal to N. That is, the cells where the physical channel(s) scheduled via the DCI is located vary in a semi-static range (i.e., N cells), which is denoted as case 2.

In some embodiments of the disclosure, the first cell may be one of the cells where the physical channel(s) scheduled via the DCI is located.

For example, in the case where the first DCI is used to schedule at least one physical channel for transmission in the M cells, the first cell may be one of the M cells.

It is understood that in embodiments of the disclosure, the network device and the terminal device have a same understanding of a manner for determining the first cell. For example, the network device indicates the first cell to the terminal device via a first sequence, and the terminal device determines the first cell from the M cells according to the first sequence, which helps to ensure that the terminal device can apply the transmission parameter for the first signal carried in the first DCI to a suitable cell.

The manner for determining a cell (i.e., the first cell) to which the transmission parameter for the first signal is applied is described in connection with specific embodiments as follows.

In embodiment 1, the first cell is determined according to the first sequence from the cells where the physical channel (s) scheduled via the first DCI is located.

In some embodiments, in the case where the first DCI is used to schedule at least one physical channel for transmission in the M cells, a cell in the M cells may be determined as the first cell according to the first sequence.

In some embodiments, the first sequence is one of: a sequence indicated in the first DCI, a cell numbering sequence, a cell priority sequence, a predefined cell sequence, and a cell sequence preconfigured by higher layer signalling.

That is, the first sequence may be configured by the network device (e.g., indicated by DCI, or pre-configured by higher layer signalling), the first sequence may be predefined, or the first sequence may be determined according to an agreed parameter (e.g., a cell number, or a cell priority).

In some embodiments, the first cell may be a cell that is ranked first or last among the M cells in the first sequence.

The manner for determining the first cell is described in connection with a specific implementation of the first sequence as follows.

In embodiment 1-1, the first cell is determined according to the sequence indicated in the first DCI.

For example, in the case where the first DCI is used to schedule at least one physical channel for transmission in the M cells, a cell in the M cells may be determined as the first cell according to the sequence indicated in the first DCI.

In some embodiments, the first DCI may contain a first information field, where the first information field is used to indicate or schedule the M cells.

For example, the first information field contains identifiers (IDs) (e.g., cell number) of the M cells.

The sequence of the IDs of the M cells contained in the first information field may be a cell sequence indicated in the first DCI.

In some embodiments, the first cell is a first cell or last cell indicated or scheduled via the first information field.

For example, a cell corresponding to a first cell number or a last cell number contained in the first information field may be determined as the first cell.

In some embodiments, the first cell is a cell indicated or scheduled via a highest X bit(s) of the first information field or via a lowest Y bit(s) of the first information field, where X is a positive integer, and Y is a positive integer. The highest X bit(s) may indicate or be used to schedule a cell, and the lowest Y bit(s) may indicate or be used to schedule a cell. For example, the highest X bit(s) may indicate a cell number, and the lowest Y bit(s) may indicate a cell number. Magnitude of X and Y may be determined according to a cell number.

In some embodiments, the first information field may contain M bit groups. Each bit group indicates a cell. The first cell may be a cell indicated by a first bit group or a last bit group of the M bit groups, where each bit group may contain one or more bits. It is understood that the number of bits contained in each bit group may be the same or may be different.

In some embodiments, the first information field may contain M indication fields. Each indication field indicates a cell. The first cell may be a cell indicated by a first indication field or a last indication field of the M indication fields, where each indication field may contain one or more bits. It is understood that the number of bits contained in each indication field may be the same or may be different.

Figure 3:
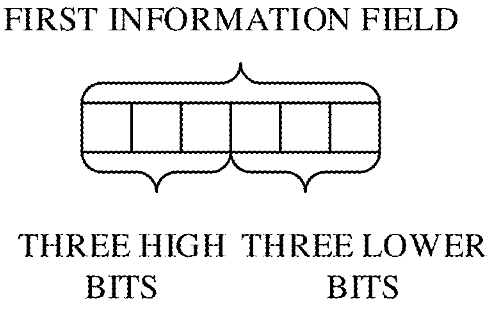
FIG. 3 is a schematic diagram of a first information field provided by embodiments of the disclosure.

As an example, the terminal device supports aggregation for three cells. The three cells are cell 0, cell 1, and cell 2, respectively. The first DCI schedules two physical channels for transmission in two cells (cell 0 and cell 2). The first DCI contains the first information field. The highest X (e.g., X=3) bits indicate the first cell number, and the lowest Y (e.g., Y=3) bits indicate the second cell number, as illustrated in FIG. 3. Take that the first cell is a first cell indicated or scheduled via the first information field as an example, in the case where the network device indicates to the terminal device that the transmission parameter for the first signal is applied to cell 2, the highest 3 bits may be set to indicate cell 2, the lowest Y bits may be set to indicate cell 0, and the terminal device may determine that the first cell is cell 2 according to an indication sequence; in the case where the network device indicates to the terminal device that the transmission parameter for the first signal is applied to cell 0, the highest 3 bits may be set to indicate cell 0, the lowest Y bits may be set to indicate cell 2, and the terminal device may determine that the first cell is cell 0 according to the indication sequence.

Figure 4:
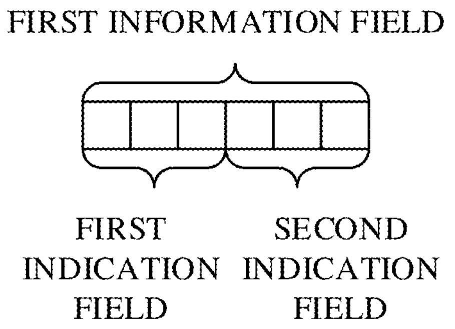
FIG. 4 is another schematic diagram of a first information field provided by embodiments of the disclosure.

As an example, the terminal device supports aggregation for three cells. The three cells are cell 0, cell 1, and cell 2, respectively. The first DCI schedules two physical channels for transmission in two cells (cell 0 and cell 2). The first DCI contains the first information field. The first information field contains a first indication field and a second indication field. The first indication field indicates the first cell number, and the second indication field indicates the second cell number, as illustrated in FIG. 4. Take that the first cell is a first cell indicated or scheduled via the first indication field contained in the first information field as an example, in the case where the network device indicates to the terminal device that the transmission parameter for the first signal is applied to cell 2, the first indication field may be set to indicate cell 2, the second indication field may be set to indicate cell 0, and the terminal device may determine that the first cell is cell 2 according to the indication sequence; in the case where the network device indicates to the terminal device that the transmission parameter for the first signal is applied to cell 0, the first indication field may be set to indicate cell 0, the second indication field may be set to indicate cell 2, and the terminal device may determine that the first cell is cell 0 according to the indication sequence.

Based on embodiment 1-1, the network device may determine the cell to which the transmission parameter for the first signal is applied according to an information field (i.e., the first information field) indicating a cell where the physical channel is located in the first DCI, and there is no need to add an additional information field in the first DCI to indicate the first cell, which helps to reduce DCI load. Meanwhile, the network device may dynamically set a first cell or last cell indicated or scheduled via the first information field according to an actual transmission demand, so that the terminal device may apply the transmission parameter for the first signal in the first DCI to the first cell or last cell according to a setting of the first information field in the first DCI. For example, in different scenarios, different cells may be respectively set as the first cell or last cell indicated or scheduled via the first information field of DCI, so as to ensure that all cells can be indicated.

In embodiment 1-2, the first cell is determined according to the cell numbering sequence.

In manner 1, the cell numbering sequence is a cell numbering ascending sequence or a carrier numbering ascending sequence. That is, smaller numbered cells or smaller numbered carriers are top-ranked in the sequence, and larger numbered cells or larger numbered carriers are bottom-ranked in the sequence.

In manner 2, the cell numbering sequence is a cell numbering descending sequence or a carrier numbering descending sequence. That is, smaller numbered cells or smaller numbered carriers are bottom-ranked in the sequence, and larger numbered cells or larger numbered carriers are top-ranked in the sequence.

In some embodiments, in the case where the first DCI is used to schedule at least one physical channel for transmission in the M cells, a cell in the M cells may be determined as the first cell according to the cell numbering sequence.

That is, the first cell may be a cell that is ranked first or last among the M cells.

As an example, the terminal device supports aggregation for three cells. The three cells are cell 0, cell 1, cell 2, respectively. The first DCI schedules two physical channels for transmission in cell 0 and cell 2. Take that the first cell is a cell that ranked first in the cell numbering sequence as an example, then the first cell is cell 0.

Based on embodiment 1-2, the terminal device may determine, according to the cell numbering sequence, the first cell from cells scheduled via the first DCI, which is simple to implement. Moreover, both the terminal device and the network device determine the first cell according to the cell numbering sequence, which helps to ensure that the terminal device can apply the transmission parameter for the first signal carried in the first DCI to a suitable cell.

In embodiment 1-3, the first cell is determined according to the cell priority sequence.

In some embodiments, the cell priority sequence may be predefined or may be configured by the network device. For example, the network device may pre-configure the cell priority sequence via higher layer signalling.

In some embodiments, the higher layer signalling may, for example, include, but is not limited to, a radio resource control (RRC) signalling and a media access control (MAC) signalling.

In some embodiments, in the case where the first DCI is used to schedule at least one physical channel for transmission in the M cells, a cell in the M cells may be determined as the first cell according to the cell priority sequence.

For example, a cell with the highest priority in the M cells may be determined as the first cell.

In some embodiments, the cell priority sequence may be determined according to attributes of carriers on cells.

Optionally, the attribute of a carrier on a cell may be configured by the network device, e.g., via higher layer signalling.

For example, when a carrier on a cell is configured as a primary carrier, the cell has the highest priority, and when a carrier on a cell is configured as a secondary carrier, the cell has the lowest priority.

As an example, the cell priority sequence of cells determined according to the attributes of the carriers on the cells may be: primary cell (PCell)/special cell (SpCell)/primary SCG Cell (PSCell)>secondary cell (Scell).

That is, the PCell, SpCell, and PSCell each has a higher priority than the Scell.

For example, the terminal device supports aggregation for three cells. The three cells are cell 0, cell 1, and cell 2, respectively. The first DCI schedules two physical channels for transmission in cell 0 and cell 2, where cell 0 is a Pcell and cell 2 is a Scell, i.e., the priority of cell 0 is higher than the priority of cell 2, then the first cell is cell 0.

Based on embodiment 1-3, the terminal device may determine, according to the cell priority sequence, the first cell from cells scheduled via the first DCI, which is simple to implement. Moreover, both the terminal device and the network device determine the first cell according to the cell priority sequence, which helps to ensure that the terminal device can apply the transmission parameter for the first signal carried in the first DCI to the suitable cell.

In embodiment 1-4, the first cell is determined according to the predefined cell sequence.

In some embodiments, in the case where the first DCI is used to schedule at least one physical channel for transmission in the M cells, a cell in the M cells may be determined as the first cell according to the predefined cell sequence.

For example, a cell that is ranked first or last among the M cells may be determined as the first cell.

As an example, the predefined cell sequence may be cell 1, cell 2, and cell 0. The terminal device supports aggregation for three cells. The three cells are cell 0, cell 1, and cell 2, respectively. The first DCI schedules two physical channels for transmission in cell 0 and cell 2. Take that the first cell is a cell that is ranked first between cell 0 and cell 2 as an example, the first cell is cell 2.

Based on embodiment 1-4, the terminal device may determine, according to the predefined cell sequence, the first cell from cells scheduled via the first DCI, which is simple to implement. Moreover, both the terminal device and the network device determine the first cell according to the predefined cell sequence, which helps to ensure that the terminal device can apply the transmission parameter for the first signal carried in the first DCI to the suitable cell.

In embodiment 1-5, the first cell is determined according to the cell sequence preconfigured by higher layer signalling.

In some embodiments, the higher layer signalling may include, for example, but is not limited to, an RRC signalling and a MAC signalling.

In some embodiments, in the case where the first DCI is used to schedule at least one physical channel for transmission in the M cells, a cell in the M cells may be determined as the first cell according to the cell sequence preconfigured.

For example, a cell that is ranked first or last among the M cells is determined as the first cell.

In some embodiments, the network device may indirectly indicate a sequence (or priorities) of cells by configuring attributes of carriers on the cells. For example, in the case where a carrier on a cell is configured as a primary carrier, the cell is ranked first or has a highest priority, and in the case where a carrier on a cell is configured as a secondary carrier, the cell is ranked last or has a lowest priority.

As an example, the cell sequence preconfigured by the higher layer signalling may be cell 1, cell 0, and cell 2. The terminal device supports aggregation for three cells. The three cells are cell 0, cell 1, and cell 2, respectively. The first DCI schedules two physical channels for transmission in cell 0 and cell 2. Take that the first cell is a cell that is ranked first between cell 0 and cell 2 as an example, the first cell is cell 0.

Based on embodiment 1-5, the terminal device may determine, according to the cell sequence preconfigured by the higher layer signalling, the first cell from cells scheduled via the first DCI, which is simple to implement. Moreover, both the terminal device and the network device determine the first cell according to the cell sequence preconfigured by the higher layer signalling, which helps to ensure that the terminal device can apply the transmission parameter for the first signal carried in the first DCI to the suitable cell.

In embodiment 2, the first cell is determined according to a transmission direction of the first signal.

In some embodiments, the first cell is determined based on the transmission direction of the first signal, and based on a transmission direction of a physical channel in a cell scheduled via the first DCI or a transmission direction of a resource in the cell scheduled via the first DCI.

In some embodiments, the resource may include a time domain resource and/or a frequency domain resource.

In some embodiments, if the physical channel is a physical uplink channel, such as a PUSCH, the transmission direction of the physical channel may refer to an uplink direction, alternatively, if the physical channel is a physical downlink channel, such as a PDSCH, the transmission direction of the physical channel may refer to a downlink direction.

In some embodiments, if the resource can be used for transmission of a physical uplink channel or transmission of an uplink signal (e.g., an SRS), the transmission direction of the resource is an uplink direction, alternatively, if the resource can be used for transmission of a physical downlink channel or transmission of a downlink signal (e.g., a CSI-RS, or a PTRS), the transmission direction of the resource is a downlink direction. In some embodiments, a resource of which a transmission direction is an uplink direction may include an uplink resource and/or a flexible resource.

In some embodiments, a resource of which a transmission direction is a downlink direction may include a downlink resource and/or a flexible resource.

In some embodiments, the uplink resource may include, but is not limited to, an uplink symbol, the downlink resource may include, but is not limited to, a downlink symbol, and the flexible resource may include, but is not limited to, a flexible symbol, where the flexible symbol may be used for both uplink transmission and downlink transmission.

In some embodiments, a resource in a cell may refer to a resource configured for the cell or a resource configured for signal transmission or channel transmission in the cell.

In some embodiments of the disclosure, in the first cell, a physical channel is transmitted in a direction same as the transmission direction of the first signal. That is, the first cell may be a cell in which a physical channel is transmitted in a direction same as the transmission direction of the first signal in the N cells or the M cells.

It is understood that in embodiments of the disclosure, the case that the physical channel is transmitted in the direction same as the transmission direction of the first signal may refer to that a signal carried in the physical channel is transmitted in a direction same as the transmission direction of the first signal.

In some embodiments, the first DCI is used to schedule at least one physical channel for transmission in the N cells, for example as illustrated in aforementioned case 1. In this case, the first cell may be a cell in which a physical channel is transmitted in a direction same as the transmission direction of the first signal in the N cells.

As an example, in the case where the first signal is an uplink signal, e.g., an SRS, the first cell is a cell in which a physical uplink channel (e.g., a PUSCH) is transmitted in the N cells.

As an example, in the case where the first signal is a downlink signal, e.g., a CSI-RS or PTRS, the first cell is a cell in which a physical downlink channel (e.g., a PDSCH) is transmitted in the N cells.

In some embodiments, the first DCI is used to schedule at least one physical channel for transmission in the M cells, for example as illustrated in the aforementioned case 2. In this case, the first cell may be a cell in which a physical channel is transmitted in a direction same as the transmission direction of the first signal in the N cells.

As an example, in the case where the first signal is an uplink signal, e.g., an SRS, the first cell is a cell in which a physical uplink channel (e.g., a PUSCH) is transmitted in the N cells.

As an example, in the case where the first signal is a downlink signal, e.g., a CSI-RS, and a PTRS, the first cell is a cell in which a physical downlink channel (e.g., the PDSCH) is transmitted in the N cells.

In some embodiments of the disclosure, the transmission direction of the resource in the first cell is same as the transmission direction of the first signal. That is, the first cell may be a cell containing a resource with a same transmission direction as the first signal in the N cells or the M cells.

In some embodiments of the disclosure, the transmission direction of the resource in the first cell is same as the transmission direction of the first signal. That is, the first cell may be a cell containing a resource with a same transmission direction as the first signal in the N cells or the M cells. It is understood that in embodiments of the disclosure, the case that the transmission direction of the resource in the first cell is same as the transmission direction of the first signal may refer to that a signal carried in the resource is transmitted in a direction same as the transmission direction of the first signal.

In some embodiments, the first DCI is used to schedule at least one physical channel for transmission in the N cells, for example as illustrated in the aforementioned case 1. In this case, the first cell is a cell containing a resource with a same transmission direction as the first signal in the N cells.

As an example, in the case where the first signal is an uplink signal, e.g., an SRS, the first cell is a cell containing an uplink resource or a flexible resource in the N cells.

As an example, in the case where the first signal is a downlink signal, e.g., a CSI-RS, and a PTRS, the first cell is a cell containing a downlink resource or a flexible resource in the N cells.

In some embodiments, the first DCI is used to schedule at least one physical channel for transmission in the M cells, for example as illustrated in the aforementioned case 2. In this case, the first cell is a cell containing a resource with a same transmission direction as the first signal in the N cells.

As an example, in the case where the first signal is an uplink signal, e.g., an SRS, the first cell is a cell containing an uplink resource or a flexible resource in the N cells.

As an example, in the case where the first signal is a downlink signal, e.g., a CSI-RS, and a PTRS, the first cell is a cell containing a downlink resource or a flexible resource in the N cells.

As an example, the terminal device supports aggregation for three cells. The three cells are cell 0, cell 1, and cell 2, respectively. The first DCI schedules a PDSCH for transmission in cell 0 and schedules a PUSCH for transmission in cell 2.

If the first DCI contains a transmission parameter for an uplink signal, it is determined that a cell where a physical uplink channel is located is the first cell, i.e., the first cell is cell 2. Alternatively, if the first DCI contains a transmission parameter for a downlink signal, it is determined that a cell where a physical downlink channel is located is the first cell, i.e., the first cell is cell 0.

Based on embodiment 2, the terminal device determines the cell to which the transmission parameter for the first signal is applied according to the transmission direction of the first signal, which helps to precisely determine a cell corresponding to the transmission parameter for the first signal.

It is understood that in embodiments of the disclosure, embodiment 2 may be implemented individually or may be implemented in combination with embodiment 1, for example, embodiment 2 may be implemented in combination with any one of embodiment 1-1 to embodiment 1-4. It is understood that a specific order for combination of embodiment 1 with embodiment 2 is not limited in the disclosure. For example, in the case where multiple cells are determined according to embodiment 2, the cell to which the transmission parameter for the first signal is applied is determined further in combination with the first sequence in embodiment 1. For another example, in the case where multiple cells are determined according to embodiment 1, the cell to which the transmission parameter for the first signal is applied is determined further in combination with embodiment 2.

As an example, the terminal device supports aggregation for four cells, i.e., cell 0, cell 1, cell 2, and cell 3. The first DCI schedules a PDSCH(s) for transmission in cell 3 and cell 0 and schedules a PUSCH(s) for transmission in cell 1 and cell 2. If the first DCI contains the transmission parameter for an uplink signal, cells where a physical uplink channel(s) is located are determined to include cell 1 and cell 2 according to embodiment 2, and the first cell may be determined as cell 1 further in combination with the cell numbering sequence in embodiment 1-2 in the case where a smaller numbered cell in the cell numbering sequence is selected as the first cell.

If the first DCI contains the transmission parameter for a downlink signal, cells where a physical downlink channel(s) is located are determined to include cell 3 and cell 0 according to embodiment 2, and the first cell may be determined as cell 0 further in combination with the cell numbering sequence in embodiment 1-2 in the case where a smaller numbered cell in the cell numbering sequence is selected as the first cell.

As another example, the terminal device supports the aggregation for four cells, i.e., cell 0, cell 1. cell 2, and cell 3. The first DCI schedules a PDSCH(s) for transmission in cell 3 and cell 0 and schedules a PUSCH(s) for transmission in cell 1 and cell 2. If the first DCI contains the transmission parameter for an uplink signal, cells where a physical uplink channel(s) is located is determined to include cell 1 and cell 2 according to embodiment 2, and the first cell may be determined as cell 1 further in combination with a cell sequence indicated by higher layer signalling in embodiment 1-5 in the case where the cell sequence indicated by the higher layer signalling is cell 1>cell 2>cell 0>cell 3, i.e., cell 1 has a higher rank than cell 2.

If the first DCI contains the transmission parameter for a downlink signal, cells where a physical uplink channel(s) is located are determined to include cell 3 and cell 0 according to embodiment 2, and the first cell may be determined as cell 0 further in combination with the cell sequence indicated by the higher layer signalling in embodiment 1-5 in the case where the cell sequence indicated by the higher layer signalling is cell 1>cell 2>cell 0>cell 3, i.e., cell 0 has a higher rank than cell 3.

In embodiment 3, the first cell is pre-configured.

For example, the first cell is one of the N cells, where the N cells may be a maximum cell range that can be scheduled by the network device.

In some embodiments of the disclosure, the method 200 further includes the following.

The network device sends preconfigured information, where the preconfigured information indicates one of the N cells.

Correspondingly, the terminal device receives the preconfigured information.

In some embodiments, the network device may preconfigure one cell in the semi-static range (i.e., N cells) as the first cell.

In some embodiments, a physical channel(s) scheduled via the first DCI by the network device is transmitted in the semi-static range (i.e., N cells). For example, the first DCI always schedules a physical channel(s) for transmission in the N cells, corresponding to aforementioned case 1.

In some other embodiments, cells where a physical channel(s) scheduled via the first DCI by the network device is located vary dynamically in the semi-static range (i.e., N cells). For example, the first DCI schedules a physical channel(s) for transmission in M cells of the N cells, corresponding to aforementioned case 2.

In some embodiments, the first cell is a cell indicated by the preconfigured information. That is, the transmission parameter for the first signal carried by the first DCI or any DCI is used for the first cell.

In some embodiments, in the case where the cells where the physical channel(s) scheduled via the first DCI is located include the cell indicated by the preconfigured information, the first cell is the cell indicated by the preconfigured information.

In some embodiments, in the case where the cells where the physical channel(s) scheduled via the first DCI is located do not include the cell indicated by the preconfigured information, it may be determined that the transmission parameter for the first signal carried in the first DCI is invalid.

In this case, the terminal device may not read an information field for carrying the transmission parameter for the first signal (i.e., the second information field), not parse the information field for carrying the transmission parameter for the first signal (i.e., the second information field), and ignore (skip) the information field for carrying the transmission parameter for the first signal (i.e., the second information field) or not execute the transmission parameter for the first signal. Alternatively, for the network device, an indication result of the second information field may be set to a reserved state, an untriggered state, an off state, an unconfigured state, or an invalid state, etc., so that no valid information can be obtained even if the second information field is read.

Based on embodiment 3, the terminal device may directly determine a preconfigured cell as the first cell, which is simple to implement, and for the scheduling manner in case 1, the first information field may not be included in the DCI, which can further reduce DCI load and improve transmission reliability.

In summary, in embodiments of the present application, in the case where the first DCI schedules multiple physical channels for transmission in multiple cells, the first DCI may contain one set of transmission parameters for the first signal and does not need to contain the transmission parameter for the first signal for each cell, which helps to reduce DCI load, and the network device may indicate the cell to which the transmission parameter for the first signal contained in the first DCI is applied via the first sequence, the transmission direction of the first signal, or the preconfigured information, etc. Correspondingly, the terminal device may determine the cell to which the transmission parameter for the first signal contained in the first DCI is applied via the first sequence, the transmission direction of the first signal, or the preconfigured information, etc. so as to ensure that understanding of the network device on the cell to which the transmission parameter for the first signal is applied is in consistence with understanding of the terminal device on the cell to which the transmission parameter for the first signal is applied.

The method embodiments of the disclosure are described in detail above with reference to FIG. 2 to FIG. 4, and the apparatus embodiments of the disclosure will be described in detail below with reference to FIG. 5 to FIG. 7. It is understood that, the apparatus embodiments and the method embodiments correspond to each other, and for similar content, reference can be made to the method embodiments.

Figure 5:
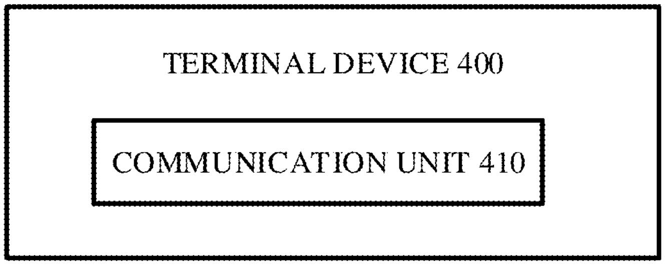
FIG. 5 is a schematic block diagram of a terminal device provided by embodiments of the disclosure.

FIG. 5 is a schematic block diagram of a terminal device 400 according to embodiments of the disclosure. As illustrated in FIG. 5, the terminal device 400 includes a communication unit 410. The communication unit 410 is configured to receive first DCI, where the first DCI contains a transmission parameter for a first signal and is used to schedule at least one physical channel for transmission in N cells, the transmission parameter for the first signal is used for a first cell, and N is a positive integer.

In some embodiments of the disclosure, the first cell is one of the N cells, or the first cell is one of M cells, where the N cells include the M cells, the at least one physical channel scheduled via the first DCI is transmitted in the M cells, M is a positive integer, and M is less than or equal to N.

In some embodiments of the disclosure, the first cell is determined from the M cells according to a first sequence.

In some embodiments of the disclosure, the first sequence is one of: a sequence indicated in the first DCI, a cell numbering sequence, a cell priority sequence, a predefined cell sequence, and a cell sequence preconfigured by a higher layer signalling.

In some embodiments of the disclosure, the first cell is a cell that is ranked first or last among the M cells in the first sequence.

In some embodiments of the disclosure, the first DCI contains a first information field, where the first information field indicates the M cells or is used to schedule the M cells, and the first cell is a first cell or last cell indicated or scheduled via the first information field; or the first DCI contains the first information field, where the first information field indicates the M cells or is used to schedule the M cells, the first cell is a cell indicated or scheduled via a highest X bit(s) of the first information field or the first cell is a cell indicated or scheduled via a lowest Y bit(s) of the first information field, X is a positive integer, and Y is a positive integer.

In some embodiments of the disclosure, the first cell is a cell in which a physical channel is transmitted in a direction same as a transmission direction of the first signal in the N cells or the M cells; or the first cell is a cell containing a resource with a same transmission direction as the first signal in the N cells or the M cells.

In some embodiments of the disclosure, in a case where the first signal is an uplink signal, the first cell is a cell for physical uplink channel transmission in the N cells or the M cells; or in a case where the first signal is the uplink signal, the first cell is a cell containing an uplink resource or a flexible resource in the N cells or the M cells; or in a case where the first signal is a downlink signal, the first cell is a cell for physical downlink channel transmission in the N cells or the M cells; or in a case where the first signal is the downlink signal, the first cell is a cell containing a downlink resource or a flexible resource in the N cells or the M cells.

In some embodiments of the disclosure, the communication unit is further configured to receive preconfigured information, and the preconfigured information indicates a cell in the N cells.

In some embodiments of the disclosure, the first cell is the cell indicated by the preconfigured information.

In some embodiments of the disclosure, in a case where the M cells include the cell indicated by the preconfigured information, the first cell is the cell indicated by the preconfigured information; or in a case where the M cells do not include the cell indicated by the preconfigured information, the transmission parameter for the first signal is invalid.

In some embodiments of the disclosure, the first DCI contains a second information field, where the second information field is used to determine or indicate the transmission parameter for the first signal.

In some embodiments of the disclosure, the first signal includes at least one of: an SRS, a CSI-RS, a zero-power CSI-RS, or a PTRS.

In some embodiments of the disclosure, the physical channel is a PUSCH or a PDSCH.

Optionally, in some embodiments, the foregoing communication unit may be a communication interface or a transceiver, or an input/output interface of a communication chip or a system-on-chip (SOC). The foregoing processing unit may be one or more processors.

It is understood that, the terminal device 400 according to embodiments of the disclosure may correspond to the terminal device in the method embodiments of the disclosure, and the foregoing and other operations and/or functions of various units in the terminal device 400 are respectively intended for implementing corresponding operations of the terminal device in the method 200 illustrated in FIG. 2 to FIG. 4, which will not be described again herein for the sake of brevity.

Figure 6:
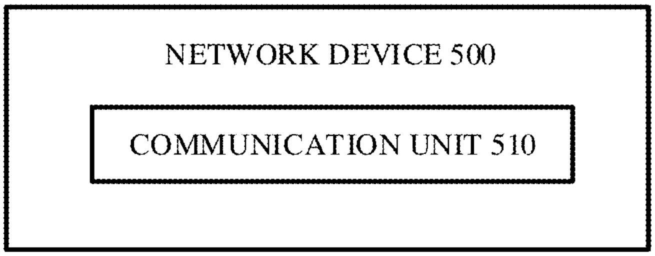
FIG. 6 is a schematic block diagram of a network device provided by embodiments of the disclosure.

FIG. 6 is a schematic block diagram of a network device according to embodiments of the disclosure. The network device 500 of FIG. 6 includes a communication unit 510. The communication unit 510 is configured to send first DCI, where the first DCI contains a transmission parameter for a first signal and is used to schedule at least one physical channel for transmission in N cells, the transmission parameter for the first signal is used for a first cell, and N is a positive integer.

In some embodiments of the disclosure, the first cell is one of the N cells; or the first cell is one of M cells, where the N cells include the M cells, the at least one physical channel scheduled via the first DCI is transmitted in the M cells, M is a positive integer, and M is less than or equal to N.

In some embodiments of the disclosure, the first cell is indicated in the M cells according to a first sequence.

In some embodiments of the disclosure, the first sequence is one of: a sequence indicated in the first DCI, a cell numbering sequence, a cell priority sequence, a predefined cell sequence, and a cell sequence preconfigured by a higher layer signalling.

In some embodiments of the disclosure, the first cell is a cell that is ranked first or last among the M cells in the first sequence.

In some embodiments of the disclosure, the first DCI contains a first information field, where the first information field indicates the M cells or is used to schedule the M cells, and the first cell is a first cell or last cell indicated or scheduled via the first information field; or the first DCI contains the first information field, where the first information field indicates the M cells or is used to schedule the M cells, the first cell is a cell indicated or scheduled via a highest X bit(s) of the first information field or the first cell is a cell indicated or scheduled via a lowest Y bit(s) of the first information field, X is a positive integer, and Y is a positive integer.

In some embodiments of the disclosure, the first cell is a cell in which a physical channel(s) is transmitted in a direction same as a transmission direction of the first signal in the N cells or the M cells; or the first cell is a cell containing a resource with a same transmission direction as the first signal in the N cells or the M cells.

In some embodiments of the disclosure, in a case where the first signal is an uplink signal, the first cell is a cell for physical uplink channel transmission in the N cells or the M cells; or in a case where the first signal is the uplink signal, the first cell is a cell containing an uplink resource or a flexible resource in the N cells or the M cells; or in a case where the first signal is a downlink signal, the first cell is a cell for physical downlink channel transmission in the N cells or the M cells; or in a case where the first signal is the downlink signal, the first cell is a cell containing a downlink resource or a flexible resource in the N cells or the M cells.

In some embodiments of the disclosure, the communication unit 510 is further configured to send preconfigured information, and the preconfigured information indicates a cell in the N cells.

In some embodiments of the disclosure, the first cell is the cell indicated by the preconfigured information.

In some embodiments of the disclosure, in a case where the M cells include the cell indicated by the preconfigured information, the first cell is the cell indicated by the preconfigured information; or in a case where the M cells do not include the cell indicated by the preconfigured information, the transmission parameter for the first signal is invalid.

In some embodiments of the disclosure, the first DCI contains a second information field, where the second information field is used to determine or indicate the transmission parameter for the first signal.

In some embodiments of the disclosure, the first signal includes at least one of: an SRS, a CSI-RS, a zero-power CSI-RS, or a PTRS.

In some embodiments of the disclosure, the physical channel is a PUSCH or a PDSCH.

Optionally, in some embodiments, the foregoing communication unit may be a communication interface or a transceiver, or an input/output interface of a communication chip or a system-on-chip (SOC). The foregoing processing unit may be one or more processors.

It is understood that, the network device 500 according to embodiments of the disclosure may correspond to the network device in the method embodiments of the disclosure, and the foregoing and other operations and/or functions of various units in the network device 500 are respectively intended for implementing corresponding operations of the network device in the method 200 illustrated in FIG. 2 to FIG. 4, which will not be described again herein for the sake of brevity.

Figure 7:
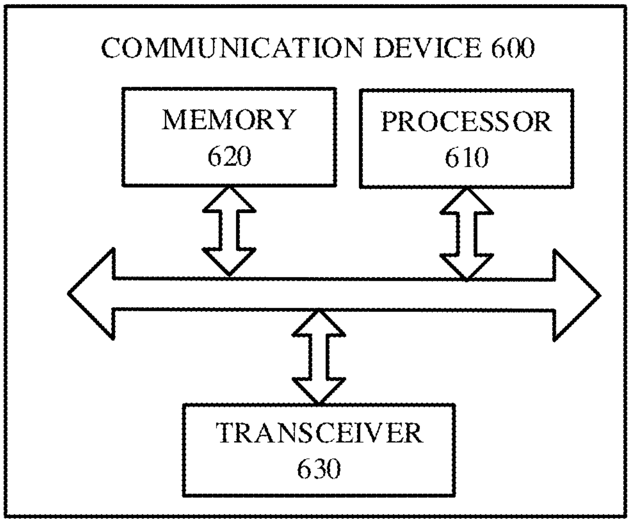
FIG. 7 is a schematic block diagram of a communication device provided by embodiments of the disclosure.

FIG. 7 is a schematic structural diagram of a communication device 600 provided in embodiments of the disclosure. The communication device 600 illustrated in FIG. 7 includes a processor 610, where the processor 610 can invoke and execute computer programs stored in a memory to implement the method in embodiments of the disclosure.

Optionally, as illustrated in FIG. 7, the communication device 600 may further include a memory 620, where the processor 610 can invoke and execute computer programs stored in the memory 620 to implement the method in embodiments of the disclosure.

The memory 620 may be a separate device independent of the processor 610, or may be integrated into the processor 610.

Optionally, as illustrated in FIG. 7, the communication device 600 may further include a transceiver 630. The processor 610 can control the transceiver 630 to communicate with other devices, and specifically, to send information or data to other devices or receive information or data sent by other devices.

The transceiver 630 may include a transmitter and a receiver. The transceiver 630 can further include an antenna, where one or more antennas may be provided.

Optionally, the communication device 600 may specifically be a network device in embodiments of the disclosure, and the communication device 600 may implement corresponding operations implemented by the network device in various methods in embodiments of the disclosure, which will not be described again herein for the sake of brevity.

Optionally, the communication device 600 may specifically be a mobile terminal/terminal device in embodiments of the disclosure, and the communication device 600 may implement corresponding operations implemented by the mobile terminal/terminal device in various methods in embodiments of the disclosure, which will not be described again herein for the sake of brevity.

Figure 8:
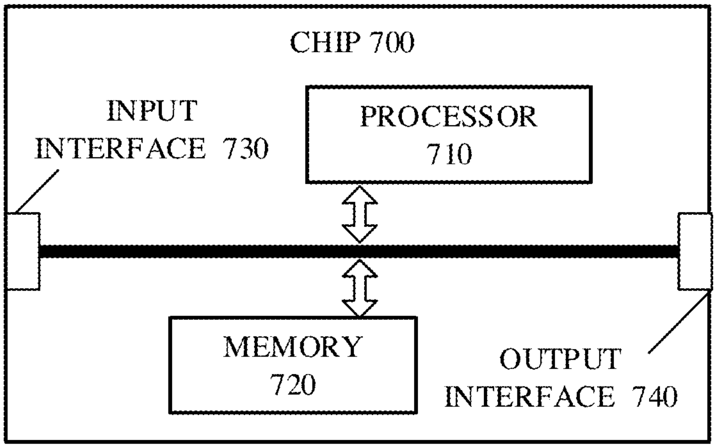
FIG. 8 is a schematic block diagram of a chip provided by embodiments of the disclosure.

FIG. 8 is a schematic structural diagram of a chip according to embodiments of the disclosure. The chip 700 illustrated in FIG. 8 includes a processor 710. The processor 710 can invoke and execute computer programs stored in a memory, so as to implement the method in embodiments of the disclosure.

Optionally, as illustrated in FIG. 8, the chip 700 may further include a memory 720. The processor 710 can invoke and execute computer programs stored in the memory 720, so as to implement the method in embodiments of the disclosure.

The memory 720 may be a separate device independent of the processor 710, or may be integrated into the processor 710.

Optionally, the chip 700 may further include an input interface 730. The processor 710 can control the input interface 730 to communicate with other devices or chips, and specifically, to obtain information or data sent by other devices or chips.

Optionally, the chip 700 may further include an output interface 740. The processor 710 can control the output interface 740 to communicate with other devices or chips, and specifically, to output information or data to other devices or chips.

Optionally, the chip may be applied to the network device in embodiments of the disclosure, and the chip may implement corresponding operations implemented by the network device in various methods in embodiments of the disclosure, which will not be described again herein for the sake of brevity.

Optionally, the chip may be applied to the mobile terminal/terminal device in embodiments of the disclosure, and the chip may implement corresponding operations implemented by the mobile terminal/terminal device in various methods in embodiments of the disclosure, which will not be described again herein for the sake of brevity.

It is understood, the chip in embodiments of the disclosure may also be an SOC.

Figure 9:
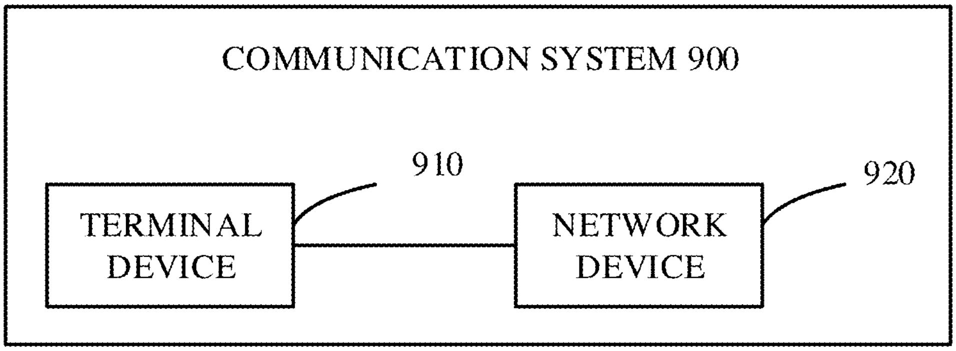
FIG. 9 is a schematic block diagram of a communication system provided by embodiments of the disclosure.

FIG. 9 is a schematic block diagram of a communication system 900 provided in embodiments of the disclosure. As illustrated in FIG. 9, the communication system 900 includes a terminal device 910 and a network device 920.

The terminal device 910 may be configured to implement corresponding functions implemented by the terminal device in the foregoing method, and the network device 920 may be configured to implement corresponding functions implemented by the network device in the foregoing method, which will not be described in detail again herein for the sake of brevity.

It should be understood that, the processor in embodiments of the disclosure may be an integrated circuit chip with signal processing capabilities. During implementation, each step of the foregoing method embodiments may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in embodiments of the disclosure can be implemented or executed. The general-purpose processor may be a microprocessor, or the processor may be any conventional processor or the like. The steps of the method disclosed in embodiments of the disclosure may be directly implemented by a hardware decoding processor, or may be performed by hardware and software modules in the decoding processor. The software module can be located in a storage medium such as a random access memory (RAM), a flash memory, a read-only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory in embodiments of the disclosure may be a volatile memory or a non-volatile memory, or may include both the volatile memory and the non-volatile memory. The non-volatile memory may be a ROM, a PROM, an erasable PROM (EPROM), an electric EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ES- DRAM), a synchlink DRAM (SLDRAM), and a direct Rambus RAM (DR RAM). It should be noted that, the memory of the systems and methods described in the disclosure is intended to include, but is not limited to, these and any other suitable types of memory.

It should be understood that, the memory above is intended for illustration rather than limitation. For example, the memory in embodiments of the disclosure may also be an SRAM, a DRAM, an SDRAM, a DDR SDRAM, an ESDRAM, a SLDRAM, a DR RAM, etc. In other words, the memory in embodiments of the disclosure is intended to include, but is not limited to, these and any other suitable types of memory.

Embodiments of the disclosure further provide a computer-readable storage medium. The computer-readable storage medium is configured to store computer programs.

Optionally, the computer-readable storage medium may be applied to the network device in embodiments of the disclosure, and the computer programs are operable with a computer to execute corresponding operations implemented by the network device in various methods in embodiments of the disclosure, which will not be described again herein for the sake of brevity.

Optionally, the computer-readable storage medium may be applied to a mobile terminal/terminal device in embodiments of the disclosure, and the computer programs are operable with a computer to execute corresponding operations implemented by the mobile terminal/terminal device in various methods in embodiments of the disclosure, which will not be described again herein for the sake of brevity.

Embodiments of the disclosure further provide a computer program product. The computer program product includes computer program instructions.

Optionally, the computer program product may be applied to the network device in embodiments of the disclosure, and the computer program instructions are operable with a computer to execute corresponding operations implemented by the network device in various methods in embodiments of the disclosure, which will not be described again herein for the sake of brevity.

Optionally, the computer program product may be applied to a mobile terminal/terminal device in embodiments of the disclosure, and the computer program instructions are operable with a computer to execute corresponding operations implemented by the mobile terminal/terminal device in various methods in embodiments of the disclosure, which will not be described again herein for the sake of brevity.

Embodiments of the disclosure further provide a computer program.

Optionally, the computer program may be applied to the network device in embodiments of the disclosure. The computer program, when executed by a computer, is operable to implement corresponding operations implemented by the network device in various methods in embodiments of the disclosure, which will not be described again herein for the sake of brevity.

Optionally, the computer program may be applied to a mobile terminal/terminal device in embodiments of the disclosure. The computer program, when executed by a computer, is operable to implement corresponding operations implemented by the mobile terminal/terminal device in various methods in embodiments of the disclosure, which will not be described again herein for the sake of brevity.

Those of ordinary skill in the art will appreciate that units and algorithmic operations of various examples described in connection with embodiments of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and brevity, in terms of the specific working processes of the foregoing systems, apparatuses, and units, reference can be made to the corresponding processes in the foregoing method embodiments, which will not be repeated herein.

It will be appreciated that the systems, apparatuses, and methods disclosed in embodiments of the disclosure may also be implemented in various other manners. For example, the above apparatus embodiments are merely illustrative, e.g., the division of units is only a division of logical functions, and other manners of division may be available in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various embodiments of the disclosure may be integrated into one processing unit or may be present as a number of physically separated units, and two or more units may be integrated into one.

If the functions are implemented as software functional units and sold or used as standalone products, they may be stored in a computer-readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computer device, e.g., a personal computer, a server, a network device, etc., to execute some or all operations of the methods described in various embodiments of the disclosure. The above storage medium may include various kinds of media that can store program codes, such as a universal serial bus (USB) flash disk, a mobile hard drive, a ROM, a RAM, a magnetic disk, or an optical disk.

The foregoing elaborations are merely implementations of the disclosure, but are not intended to limit the protection scope of the disclosure. Any variation or replacement easily thought of by those skilled in the art within the technical scope disclosed in the disclosure shall belong to the protection scope of the disclosure. Therefore, the protection scope of the disclosure shall be subject to the protection scope of the claims.

What is claimed is:

1. A method for wireless communication, comprising:

receiving, by a terminal device, first downlink control information (DCI), wherein the first DCI contains a transmission parameter for a first signal and is used to schedule at least one physical channel for transmission in N cells, the transmission parameter for the first signal is used for a first cell, and N is a positive integer;

wherein the first cell is one of M cells, wherein the N cells comprise the M cells, the at least one physical channel scheduled via the first DCI is transmitted in the M cells, M is a positive integer, and M is less than or equal to N;

wherein the first cell is determined from the M cells according to a first sequence;

wherein the first sequence is one of: a sequence indicated in the first DCI; a cell numbering sequence; a cell priority sequence; a predefined cell sequence; and a cell sequence preconfigured by higher layer signalling;

wherein the first cell is a cell that is ranked first or last among the M cells in the first sequence;

wherein: the first DCI contains a first information field, wherein the first information field indicates the M cells or is used to schedule the M cells, and the first cell is a first cell or last cell indicated or scheduled via the first information field; or the first DCI contains the first information field, wherein the first information field indicates the M cells or is used to schedule the M cells, the first cell is a cell indicated or scheduled via a highest X bit of the first information field or the first cell is a cell indicated or scheduled via a lowest Y bit of the first information field, X is a positive integer, and Y is a positive integer.

2. The method of claim 1, wherein the first cell is a cell in which a physical channel is transmitted in a direction same as a transmission direction of the first signal in the N cells or the M cells; or the first cell is a cell containing a resource with a same transmission direction as the first signal in the N cells or the M cells.

3. The method of claim 2, wherein in a case where the first signal is an uplink signal, the first cell is a cell for physical uplink channel transmission in the N cells or the M cells; or in a case where the first signal is an uplink signal, the first cell is a cell containing an uplink resource or a flexible resource in the N cells or the M cells; or in a case where the first signal is a downlink signal, the first cell is a cell for physical downlink channel transmission in the N cells or the M cells; or in a case where the first signal is a downlink signal, the first cell is a cell containing a downlink resource or a flexible resource in the N cells or the M cells.

4. A terminal device, comprising:

a transceiver;

a processor coupled to the transceiver; and a memory storing a computer program which, when executed by the processor, causes the terminal device to:

receive first downlink control information (DCI), wherein the first DCI contains a transmission parameter for a first signal and is used to schedule at least one physical channel for transmission in N cells, the transmission parameter for the first signal is used for a first cell, and N is a positive integer, wherein the first cell is one of M cells, wherein the N cells comprise the M cells, the at least one physical channel scheduled via the first DCI is transmitted in the M cells, M is a positive integer, and M is less than or equal to N;

wherein the first cell is determined from the M cells according to a first sequence;

wherein the first sequence is one of: a sequence indicated in the first DCI; a cell numbering sequence; a cell priority sequence; a predefined cell sequence; and a cell sequence preconfigured by higher layer signalling;

wherein the first cell is a cell that is ranked first or last among the M cells in the first sequence;

wherein: the first DCI contains a first information field, wherein the first information field indicates the M cells or is used to schedule the M cells, and the first cell is a first cell or last cell indicated or scheduled via the first information field; or the first DCI contains the first information field, wherein the first information field indicates the M cells or is used to schedule the M cells, the first cell is a cell indicated or scheduled via a highest X bit of the first information field or the first cell is a cell indicated or scheduled via a lowest Y bit of the first information field, X is a positive integer, and Y is a positive integer.

5. The terminal device of claim 4, wherein the first cell is a cell in which a physical channel is transmitted in a direction same as a transmission direction of the first signal in the N cells or the M cells; or the first cell is a cell containing a resource with a same transmission direction as the first signal in the N cells or the M cells, wherein in a case where the first signal is an uplink signal, the first cell is a cell for physical uplink channel transmission in the N cells or the M cells; or in a case where the first signal is an uplink signal, the first cell is a cell containing an uplink resource or a flexible resource in the N cells or the M cells; or in a case where the first signal is a downlink signal, the first cell is a cell for physical downlink channel transmission in the N cells or the M cells; or in a case where the first signal is a downlink signal, the first cell is a cell containing a downlink resource or a flexible resource in the N cells or the M cells.

6. A network device, comprising:

a transceiver;

a processor coupled to the transceiver; and a memory storing a computer program which, when executed by the processor, causes the network device to:

send first downlink control information (DCI), wherein the first DCI contains a transmission parameter for a first signal and is used to schedule at least one physical channel for transmission in N cells, the transmission parameter for the first signal is used for a first cell, and N is a positive integer, wherein the first cell is one of M cells, wherein the N cells comprise the M cells, the at least one physical channel scheduled via the first DCI is transmitted in the M cells, M is a positive integer, and M is less than or equal to N;

wherein the first cell is determined from the M cells according to a first sequence;

wherein the first sequence is one of: a sequence indicated in the first DCI; a cell numbering sequence; a cell priority sequence; a predefined cell sequence; and a cell sequence preconfigured by higher layer signalling;

wherein the first cell is a cell that is ranked first or last among the M cells in the first sequence;

wherein: the first DCI contains a first information field, wherein the first information field indicates the M cells or is used to schedule the M cells, and the first cell is a first cell or last cell indicated or scheduled via the first information field; or the first DCI contains the first information field, wherein the first information field indicates the M cells or is used to schedule the M cells, the first cell is a cell indicated or scheduled via a highest X bit of the first information field or the first cell is a cell indicated or scheduled via a lowest Y bit of the first information field, X is a positive integer, and Y is a positive integer.

7. The network device of claim 6, wherein the first cell is a cell in which a physical channel is transmitted in a direction same as a transmission direction of the first signal in the N cells or the M cells; or the first cell is a cell containing a resource with a same transmission direction as the first signal in the N cells or the M cells, wherein in a case where the first signal is an uplink signal, the first cell is a cell for physical uplink channel transmission in the N cells or the M cells; or in a case where the first signal is an uplink signal, the first cell is a cell containing an uplink resource or a flexible resource in the N cells or the M cells; or in a case where the first signal is a downlink signal, the first cell is a cell for physical downlink channel transmission in the N cells or the M cells; or in a case where the first signal is a downlink signal, the first cell is a cell containing a downlink resource or a flexible resource in the N cells or the M cells.

* * * * *